Patented Aug. 5, 1947

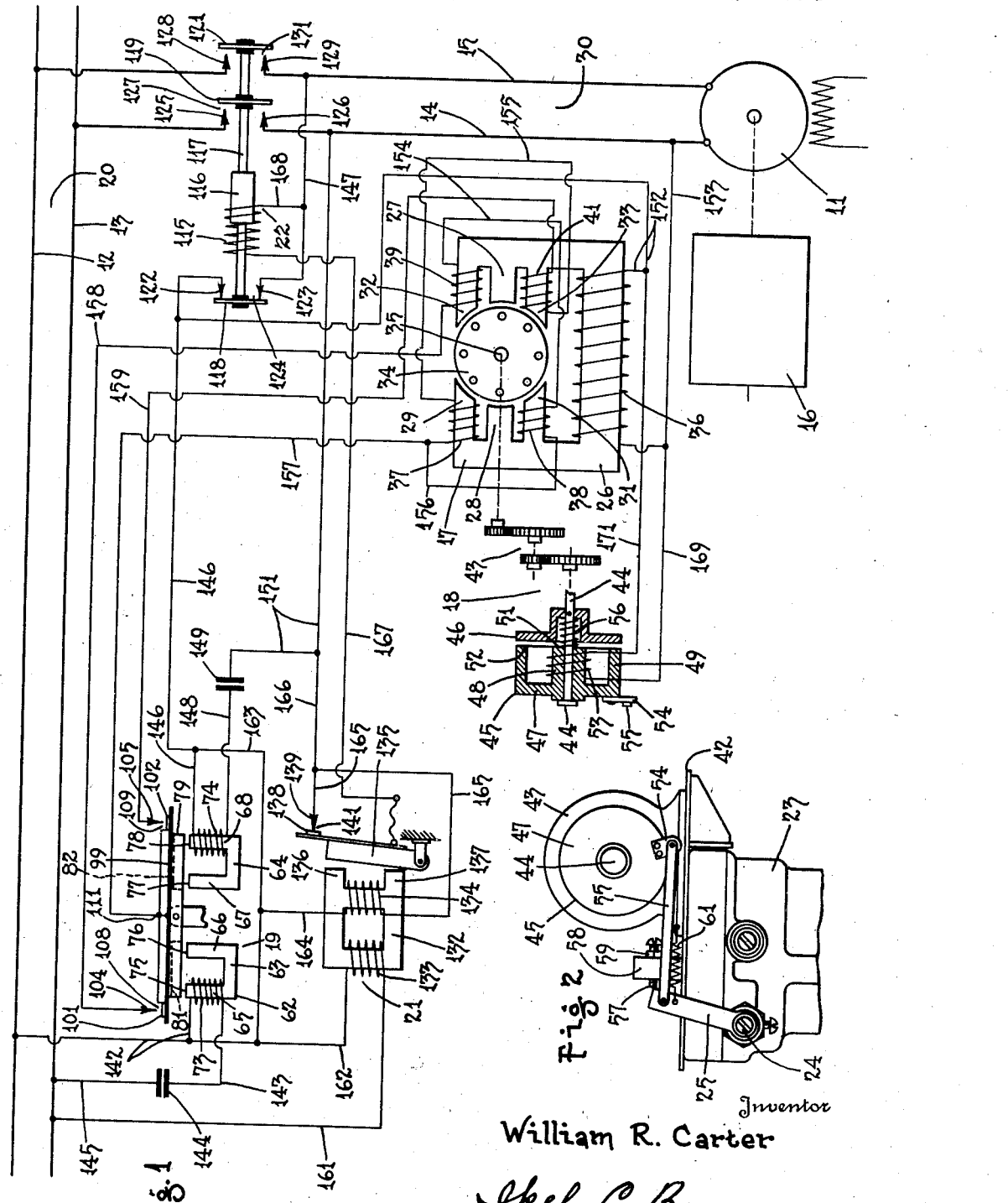

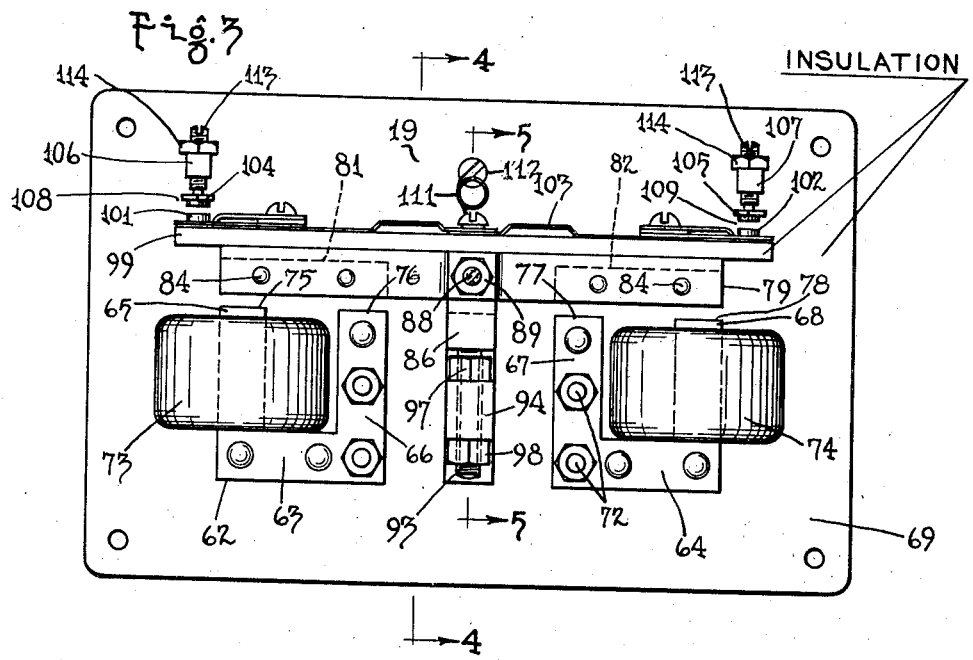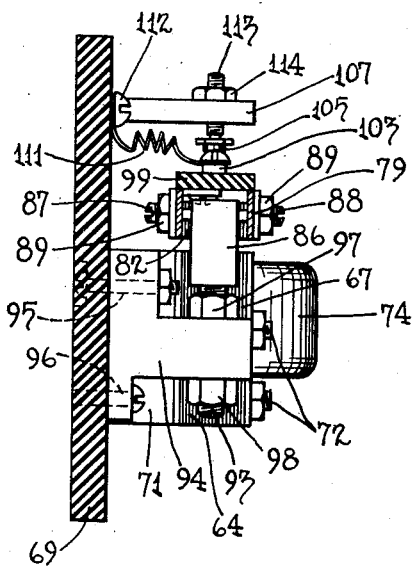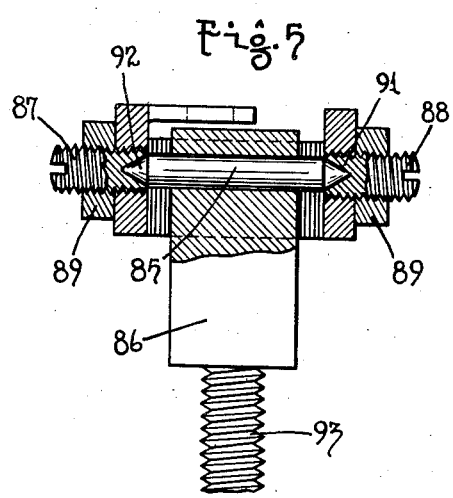

2,425,028

UNITED STATES PATENT OFFICE 2,425,028

FREQUENCY-MATCHING SYSTEM

William R. Carter, Minneapolis, Minn., assignor to Electric Machinery Manufacturing Company, Minneapolis, Minn.

Application July 1, 1944, Serial No. 543,185

16 Claims. (Cl. 171—118)

My invention relates to frequency-matching systems for alternating-current generators and has for an object to provide a system in which the frequency of the generator is maintained within close limits to the frequency of the alternating-current electrical system to which the generator is to be connected.

Another object of the invention resides in providing a frequency-matching device which is highly responsive to variations in frequency.

A still further object of the invention resides in providing a frequency-matching device which is sensitive and positive in action.

An object of the invention resides in providing a frequency-matching device utilizing a core structure having two balanced magnetic circuits energized from the generator and the electrical system with which the generator is to be connected, and in providing an armature operable through unbalance of the magnetic circuits produced by variations of the frequencies of the generator and electrical system for controlling the speed of the generator to be synchronized to the system.

A feature of the invention resides in energizing said magnetic circuits by means of two electrical circuits, each having a condenser and a winding connected in resonant relationship.

Another object of the invention resides in providing the core structure with two core members having windings thereon energized by the circuits connected to the generator, and the electrical system with which it is to be synchronized and in further providing condensers connected in said electrical circuits in series with said windings.

A still further object of the invention resides in providing a frequency-matching system in which a frequency-matching motor is employed for varying the speed of the generator to be synchronized together with driving means adapted to be disconnected from the motor upon synchronization of the generator with the electrical system.

An object of the invention resides in providing a clutch driven by the frequency-matching motor for varying the speed of the generator and in further providing means for disengaging said clutch upon synchronization of the generator with the electrical system.

Other objects of the invention reside in the novel combination and arrangement of parts and in the details of construction hereinafter illustrated and/or described.

In the drawings:

Fig. 1 is a wiring diagram of a frequency-matching system illustrating an embodiment of my invention.

Fig. 2 is an elevational detail view of the frequency-matching dry mechanism.

Fig. 3 is a plan view of the frequency-matching device.

Fig. 4 is a cross-sectional view taken on line 4—4 of Fig. 3.

Fig. 5 is an elevational sectional detail view taken on line 5—5 of Fig. 3 and drawn to a greater scale.

In Fig. 1, I have shown a frequency-matching system in which an alternating-current generator 11 of ordinary construction is to be synchronized with an electrical system, a part of which is represented by the line 20 having conductors 12 and 13. The generator 11 is adapted to be connected to the line 20 by means of a line 30 having conductors 14 and 15, in a manner to be presently more fully described. The generator 11 is driven by a prime mover 16 which may be an internal combustion engine, a steam engine, a water wheel, an electric motor or the like. In any event, the prime mover 16 is provided with some means for varying the speed thereof which, in the case of an internal combustion engine or a steam engine, might be the throttle or the fuel supply. In the event of a water wheel, the same would be the gate or other means for controlling the pressure or amount of water flowing to the wheel. The present invention includes a reversible electric motor indicated at 17 which operates to vary such speed-varying device for the prime mover and to change the speed thereof. The electric motor 17 operates through a drive means 18 to vary the speed of the prime mover and is actuated by means of a frequency-matching device designated in its entirety by the reference numeral 19. A synchronizing device 21 connects the generator line 30 to the system line 20 through a line switch 22 when the frequency-matching device has brought the generator to synchronous speed. These various parts will now be described in detail.

For the purpose of illustrating the invention, I have shown in Fig. 2 a portion of a governor 23 for an internal combustion engine used as the prime mover 16. This governor has the usual rotating elements (not shown) which operate the throttle of the engine to increase or decrease the speed, depending upon the position of said rotating elements. A shaft 24 of the governor 23 is turned by the movement of the rotating elements of the governor and, in turn, moves the throttle of the engine to vary the speed of the same. Since the construction of governors for internal combustion engines is well known in the art, the construction of the same has not been shown in detail in this application. The shaft 24 has an arm 25 secured to it which extends upwardly therefrom and by means of which the shaft 24 may be turned independently of the governor actuating mechanism. In the normal operation of the governor, the arm 25 engages a limit screw 57 which is threaded in a lug 58 attached to the governor proper. This limit screw is held in adjusted position by means of a lock nut 59. A tension coil spring 61, attached to the arm 25 and to a part fixed relative to the governor proper, maintains the arm 25 in engagement with the screw 57. This construction limits the maximum speed of the prime mover, but permits opening of the throttle when the speed of the engine drops.

In the particular construction shown in Figs. 1 and 2, the electric motor illustrated is of the shaded pole type and comprises a core structure 26 having two main poles 27 and 28 and auxiliary or shaded poles 29, 31, 32 and 33. Within these poles, a rotor 34 is mounted for rotation which is supported by a shaft 35. The core structure 26 has a main winding 36 on it which produces flux through the main poles 27 and 28. The auxiliary or shaded poles 29, 31, 32 and 33 have windings 37, 38, 39 and 41 on them which are adapted to be short-circuited in diagonally disposed pairs to provide shaded poles which control the direction of rotation of the rotor 34. These various windings are connected in a manner to be presently described in detail.

The motor 17 is mounted on a base 42 which is attached to the governor 23. Also mounted on this base is a gear reduction 43 diagrammatically indicated in Fig. 1 by sets of spur gears. It can be readily comprehended that any other type of gear reduction may be used in place thereof. This gear reduction has a driven shaft 44 which extends outwardly therefrom and which is driven from the shaft 35 of motor 17 at a greatly reduced speed.

On the shaft 44 is mounted a clutch 45 which includes a plate 46 securely attached to the shaft 44. This plate is constructed of magnetic material such as iron. Cooperating with the plate 46 is a rotatable core member 47 which has a hub 48 at the center of the same and an annulus 49 at the outer portion of the same. The said hub and annulus have core faces 51 and 52 which lie in a plane and which are disposed in close proximity to the plate 46. A coil 53, wound on the hub 48, serves to energize the core member 47 and to cause the same to be attracted to the plate 46. When the coil 53 is energized, the clutch 45 becomes engaged and the core member 47 rotates with the plate 46 and shaft 44. A compression coil spring 56 disengages the clutch 45 when the coil 53 is deenergized.

The core member 47 of clutch 45 has a lug 54 attached thereto. Pivoted to this lug is a link 55, which in turn is pivoted to the arm 25 of governor 23. The core member 47 of clutch 45, upon partial rotation through the plate 46 on shaft 44, serves to turn the arm 25 and the shaft 24 in the desired direction, thereby varying the speed of the prime mover 16.

The frequency-matching device 19 includes a core structure 62 comprising two separate core members 63 and 64. Both of these core members are U-shaped in form and are provided with spaced parallel legs 65, 66, 67 and 68. These core members are mounted on a base 69 by means of the following construction. Overlying the said base are blocks 71 of insulating material on which the legs 66 and 67 of the core members 63 and 64 rest. Bolts 72 extend jointly through the base 69, the block 71 and the legs of said core member, and hold said core members in spaced relation with respect to the base 69. It will be noted that the ends of the legs 65, 66, 67 and 68 of the core members 63 and 64 form magnetic poles which have pole faces 75, 76, 77 and 78, all lying in a common plane. Mounted on the legs 65 and 68 of the core members 63 and 64 are windings 73 and 74.

Operating in conjunction with the core structure 62 is an armature 79 provided with two spaced core members 81 and 82. The armature 79 consists of a U-shaped frame member 83 between which the core members 81 and 82 are disposed. Rivets 84, extending through said frame member and core members, rigidly secure the same together. The armature 79 is mounted for swinging movement on an arbor 85 which is attached to an adjustable support 86. Bearing screws 87 and 88 are threaded into the frame member 83 and held in adjusted position relative thereto by means of lock nuts 89. These bearing screws have conical bearing cavities 91 formed therein which engage conical ends 92 formed on the arbor 85. By means of this construction, the armature 79 is mounted to swing freely relative to the core structure 62. The support 86 is provided with a threaded shank 93 extending outwardly therefrom. This shank passes through a block 94 of insulating material which is attached to the base 69 by means of bolts 95 and 96. Nuts 97 and 98, threaded on the shank 93, hold the adjustable support 86 in adjusted position.

The armature 79 has attached to it a strip 99 of insulating material which has mounted on it two movable contacts 101 and 102. Both of these contacts are connected together by means of a conductor 103 supported on the insulating strip 99. The contacts 101 and 102 are adapted to engage either of two fixed contacts 104 and 105 which are supported on posts 106 and 107 issuing outwardly from the base 69. These various contacts form two switches indicated in their entirety by the reference numerals 108 and 109. A flexible connection 111 is connected to the conductor 103 and to a binding post 112 mounted on the base 69. The contacts 104 and 105 are mounted on screws 113 which are threaded into the posts 106 and 107 and which are held in position by means of lock nuts 114.

The line switch 22 previously referred to is of ordinary construction and comprises a winding 115 with respect to which a core member 116 is movable. The core member 116 carries a shaft 117 of insulating material and on which are mounted three switch bars 118, 119 and 121. The switch bar 118 is normally in engagement with two fixed contacts 122 and 123 which form a normally-closed switch 124. The switch bar 119 is normally spaced from but adapted upon energization to engage two fixed contacts 125 and 126 which form a normally-open switch 127. In a similar manner, the switch bar 121 is normally spaced from but is adapted to engage upon energization two fixed contacts 128 and 129 which form a normally-open switch 131.

In conjunction with the frequency-matching device, the synchronizing device 21, previously referred to, is employed and serves to connect the generator 11 to the system line 20 when the frequency, voltage and phase of the generator are proper. Inasmuch as the invention will operate with any of the well known forms of synchronizing devices, the construction of the synchronizing device 21 has not been shown in detail. For the purpose of illustrating a synchronizing device, such as disclosed in the patent to Edwin Swanson, Patent No. 2,089,448, issued on the 10th day of August, 1937, has been shown. Preferably, this device comprises a core structure 132 having two windings 133 and 134 thereon. An armature 135 cooperates with poles 136 and 137 formed on the core structure 132. This armature carries a movable contact 138 adapted to engage a fixed contact 139 which forms a switch indicated in its entirety by the reference numeral 141.

The switches 127 and 131 of the line switch 22 constitute the main switches and are normally open. These two switches are connected in the generator line 30, the conductor 14 of the line 30 being connected to the contacts 125 and 126 and the conductor 15 being connected to the contacts 128 and 129. When the switch 122 is open, the generator 11 is disconnected from the alternating-current system of which the line 20 is a portion.

The frequency-matching device 19 is connected in the frequency-matching system in the following manner: The winding 73 is connected by means of a conductor 142 to the conductor 12 of the system line 20. The other end of this winding is connected by means of a conductor 143 to a condenser 144 which, in turn, is connected by means of a conductor 145 to the other conductor 13 of the line 20. The winding 74 is connected by means of a conductor 146 to the contact 122 of switch 124, while the other contact 123 of said switch is connected by means of a conductor 147 to the conductor 15 of the generator line 30. The other end of the winding 74 is connected by means of a conductor 148 to a condenser 149 which, in turn, is connected by means of a conductor 151 to the other conductor 14 of the generator line 30. It will thus be seen that the two windings 73 and 74 are separately energized, one from the system line 20 and the other from the generator line 30. In practice, suitable condensers 144 and 149 are employed, so that the circuits containing the windings 73 and 74 become resonant at a frequency somewhat above normal frequency.

The motor 17 is connected as follows: One end of winding 36 is connected by means of a conductor 152 to the conductor 146 previously referred to. The other end of this winding is connected by means of a conductor 153 directly to the conductor 14 of line 30. The two windings 38 and 39 of the motor 26 are connected in series by means of a conductor 154 which is connected to one end of each of said windings. In a similar manner, the windings 37 and 41 are likewise connected in series by means of a conductor 155 which is connected to one end of each of said windings. The other end of each of the windings 37 and 38 is connected together by means of a conductor 156 which, in turn, is connected by means of a conductor 157 to the flexible connection 111 which, in turn, is connected to the conductor 103 of the frequency-matching device 19. The other end of the winding 39 is connected by means of a conductor 158 to the contact 104 of switch 108. In a similar manner, the other end of the winding 41 is connected by means of a conductor 159 to the contact 105 of switch 109. It will thus be readily comprehended that when the line switch 22 is deenergized, switch 124 is closed and the main winding 36 of the motor 17 is energized whenever generator voltage is available. It will further be comprehended that the direction of rotation of said motor depends upon which of the switches 108 or 109 is closed.

The winding 133 of the synchronizing device 21 is connected on one end by means of a conductor 161 to the conductor 13 of line 20. The other end of this winding is connected by means of a conductor 162 to the conductor 142 which, in turn, is connected to the other conductor 12 of line 20. The windings 73 and 74 of the frequency-matching device 19 are connected together by a conductor 163 which, in turn, is connected by means of a conductor 164 with one end of the winding 134 of the synchronizing device 21. The other end of winding 134 is connected by means of a conductor 165 to the contact 139 of switch 141 and is further connected by means of a conductor 166 with the conductor 151, being thus energized from the line 30. The contact 138 of the synchronizing device 21 is connected through its armature with a conductor 167 which, in turn, is connected to the winding 115 of the line switch 22. The other end of the winding 115 of the said line switch is connected to a conductor 168 which, in turn, is connected to the conductor 147 and is thus energized from the line 30 through the switch 141.

The winding 53 of the magnetic clutch 45 is connected on one end to a conductor 169 which, in turn, is connected to the conductor 153, being thus connected to the conductor 14 of line 30. The other end of the winding 53 is connected by means of a conductor 171 to the conductor 152 which, in turn, is connected to the contact 122 of switch 124. In this manner, the clutch 45 is energized from the line 30.

My invention operates in the following manner: In normal position, the line switch 22 is deenergized and the switches 127 and 131 are open while the switch 124 is closed. At the same time, the switch 141 of the synchronizing device 21 is open. Since the energization of the winding 74 comes from the line 30, said winding, at the time of starting the generator, is deenergized, while the winding 73, being connected to the line 20, is fully energized. This causes the core member 81 of armature 79 to be attracted, whereby the switch 108 is open and the switch 109 is closed. If the generator 11 is deenergized, motor 17 remains inoperative, due to the fact that the main winding 36 thereof is energized from the line 30. Also, clutch member 47 remains stationary due to the fact that clutch 43 being connected to line 30 is deenergized. Since the switch 109 is closed, windings 41 and 37 become short-circuited and act as shaded-pole windings which give the motor torque in one direction of rotation. If, now, the prime mover 16 is started up, generator 11 commences to build up voltage and to increase the frequency of the same. During such period, the motor 17 becomes energized and commences to rotate and, in turn, rotates shaft 44. At the same time, clutch 45 becomes energized and the clutch member 47 turns and moves the link 55 and the arm 25 in a counter-clockwise direction, as shown in Fig. 2. This has the effect of opening the throttle and causing the prime mover 16 to increase its speed. As the generator 11 reaches synchronizing speed, the two magnetic circuits energized by the windings 73 and 74 become balanced and the two switches 108 and 109 both open. This causes the motor 17 to stop. If all the electrical conditions in the system are proper, the synchronizing device 21 will then close the switch 141 and energize the coil 115 of line switch 22 which closes the switches 127 and 131 and connects the line 30 to the line 20. If, however, conditions are not proper, the frequency of the generator will exceed that of the line and cause the magnetic circuit through the core member 68 to attract the core member 82 of armature 79 with greater force than the attraction on the core member 81, thereby closing the switch 108 and maintaining the switch 109 open. This short-circuits the other windings 38 and 39 of the motor 17 and causes said motor to rotate in the opposite direction. Arm 25 in shaft 24 of the governor 23 is now moved in the opposite direction and the speed of the prime mover is reduced. This continues back and forth until such a time as all of the electrical conditions of the electric generator are proper for connecting the generator to the electric system, which is then accomplished by means of the synchronizing device 21 in the customary manner. Upon operation of the synchronizing device 21, line switch 22 operates to close the switches 127 and 131 and, at the time, to open the switch 124. The opening of this switch deenergizes the motor 17 and also the magnetic clutch 45, so that the member 47 is free to rotate on shaft 44. The governor 23 may now operate independently of the motor 17 to control the speed of the prime mover 16 and to maintain the desired speed for the same.

I have found that where the condensers 144 and 149 are so selected that resonance in the two circuits containing the windings 73 and 74 occurs approximately 25% above normal frequency that excellent results are produced. At the same time, the armature 79 is raised sufficiently to form substantial air gaps between the core members 81 and 82 and the pole faces 75, 76, 77 and 78. This gives a straight line variation in the magnetomotive forces in the magnetic circuits, whereby uniformity of action of the device is procured. The movement of the armature 79 is limited by means of contacts 104 and 105, so that the core members 81 and 82 can not reach the said pole faces and cause sticking of the armature to these pole faces.

The advantages of the invention are manifest. The frequency-matching device is simple in construction and can be built at a nominal expense. This device will operate in conjunction with any type of synchronizing apparatus. By means of the normally-closed switch operated by the line switch, the entire system is cut out after the generator line has been connected to the system line. Also, the driving means for varying the speed of the prime mover is disconnected so that the entire frequency-matching device is inactive until the generator has again become disconnected from the electric system. This allows the generator to operate in its customary and intended purposes without interference from the frequency-matching device.

Changes in the specific form of my invention, as herein described, may be made within the scope of what is claimed without departing from the spirit of my invention.

Having described my invention, what I claim as new and desire to protect by Letters Patent is:

1. In a synchronizing system for connecting to an electrical system a generator driven by a prime mover having a speed-varying device, said device being provided with a movable operating member and yieldable means for normally operating the same, an electric motor for moving said operating member independently of the yieldable means, a clutch between said motor and operating member, a frequency-matching device for actuating said motor, means for connecting the generator to the system and means operable upon connection of the generator to the electrical system for disengaging said clutch to release said operating member and subject the speed-varying device to the action of the yieldable means.

2. In a synchronizing system for connecting to an electrical system a generator driven by a prime mover having a speed-varying device, said device being provided with a movable operating member and yieldable means for normally operating the same, motive means for moving said operating member independently of the yieldable means, driving means between said motor and operating member, a frequency-matching device for actuating said motive means, means for connecting the generator to the system and means operable upon connection of the generator to the electrical system for rendering said driving means inoperative and subject the speed-varying device to the action of the yieldable means.

3. In a frequency-matching device for varying the frequency of an alternating-current generator to be connected to an alternating-current system, a core structure providing two magnetic circuits, a winding associated with the core structure and producing magnetic flux in one of the magnetic circuits, said winding being energized solely by the system, a second winding associated with the core structure and producing magnetic flux in the other magnetic circuit, said second winding being energized solely by the generator, a movable armature associated with the core structure, said armature being urged to move in one direction by the flux produced by one of said windings and being urged to move in the opposite direction by the flux produced by the other of said windings, a control circuit and switch means therein operated by said armature.

4. In a frequency-matching device for varying the frequency of an alternating-current generator to be connected to an alternating-current system, a core structure providing two magnetic circuits, a winding associated with the core structure and producing magnet flux in one of the magnetic circuits, said winding being energized solely by the system, a second winding associated with the core structure and producing magnetic flux in the other magnetic circuit, said second winding being energized solely by the generator, a movable armature associated with the core structure and movable in opposite directions, and control means actuated by said armature and operable upon movement of said armature in one direction to increase the frequency of said generator and in the other direction to decrease the frequency of the generator.

5. In a frequency-matching device for varying the frequency of an alternating-current generator to be connected to an alternating-current system, two separate core members providing independent magnetic circuits, a winding on one of said core members energized solely by the electrical system, a winding on the other of said core members energized solely by the generator, a movable armature having parts associated with each of said core members and forming therewith air gaps, said armature being urged to move in one direction by the flux produced by one of said windings and being urged to move in the opposite direction by the flux produced by the other of said windings, a control circuit and switch means therein operated by said armature.

6. In a frequency-matching device for varying the frequency of an alternating-current generator to be connected to an alternating-current system, a core structure providing two magnetic circuits, a winding associated with the core structure and producing magnetic flux in one of said magnetic circuits, an electrical circuit energized from the system and including said winding, a condenser in said electrical circuit connected in resonant relationship with respect to said winding, a second winding associated with the core structure and producing magnetic flux in the other magnetic circuit, a second electrical circuit including the second winding and energized by the generator, a condenser in said second electrical circuit connected in resonant relationship with respect to said second winding, a movable armature associated with the core structure, said armature being urged to move in one direction by the flux produced by one of said windings and being urged to move in the opposite direction by the flux produced by the other winding, a control circuit, and switch means therein operated by said armature.

7. In a frequency-matching device for varying the frequency of an alternating-current generator to be connected to an alternating-current system, a core structure providing two magnetic circuits, a winding associated with the core structure and producing magnetic flux in one of said magnetic circuits, an electric circuit energized from the system and including said winding, a condenser connected in said circuit in series with said winding, a second winding associated with the core structure and producing magnetic flux in the other magnetic circuit, a second electrical circuit including the second winding and energized by the generator, a condenser connected in said second circuit in series with said second winding, a movable armature associated with the core structure, said armature being urged to move in one direction by the flux produced by one of said windings and being urged to move in the opposite direction by the flux produced by the other winding, a control circuit, and switch means therein operated by said armature.

8. In a frequency-matching device for varying the frequency of an alternating-current generator to be connected to an alternating-current system, two separate core members providing independent magnetic circuits, a winding on one of said core members energized solely by the electrical system, a winding on the other of said core members energized solely by the generator, a movable armature having parts associated with each of said core members and forming therewith air gaps, said armature being urged to move in one direction by the flux produced by one of said windings and being urged to move in the opposite direction by the flux produced by the other of said windings, limit means for controlling the movement of the armature to limit the lengths of the air gaps to predetermined minimums.

9. In a frequency-matching device for varying the frequency of an alternating-current generator to be connected to an alternating-current system, a core structure having two magnetic poles, a winding energized by the system and producing magnetic flux through one of said poles, a winding energized by the generator and producing magnetic flux through the other of said poles, an armature having portions disposed adjacent said poles and forming air gaps therebetween, supporting means for supporting said armature for movement toward and from the poles so that one of the portions of said armature approaches its pole and the other portion recedes from its pole when the armature is moved in one direction and adjustable guide means for guiding said supporting means for movement toward and from the poles to simultaneously decrease or increase the lengths of said air gaps, a control circuit and switch means therein operated by said armature.

10. In a frequency-matching device for varying the frequency of an alternating-current generator to be connected to an alternating-current system, a core structure having two magnetic poles, a winding energized by the system and producing magnetic flux through one of said poles, a winding energized by the generator and producing magnetic flux through the other of said poles, an armature having portions disposed adjacent said poles and forming air gaps therebetween, means for supporting said armature for movement toward and from the poles to alternately vary said air gaps, adjustable guide means for guiding the armature for movement toward and from the poles to simultaneously decrease or increase said air gaps, a control circuit and switch means therein operated by said armature.

11. In a frequency-matching device for varying the frequency of an alternating-current generator to be connected to an alternating-current system, a core structure having two magnetic poles, a winding energized by the system and producing magnetic flux through one of said poles, a winding energized by the generator and producing magnetic flux through the other of said poles, an armature having magnetic portions disposed adjacent said poles and forming air gaps therebetween, pivot means for pivoting said armature for swinging movement in opposite directions to cause one of said air gaps to increase and the other to decrease upon movement of the armature in one direction, means for guiding said pivot means for movement to cause both of said air gaps to simultaneously decrease or increase, a control circuit and switch means therein operated by said armature.

12. In a frequency-matching device for varying the frequency of an alternating-current generator to be connected to an alternating-current system, a core structure having two poles formed with pole faces disposed in a common plane, a winding energized by the system and producing magnetic flux through one of said poles, a winding energized by the generator and producing magnetic flux through the other of said poles, an armature having magnetic portions disposed adjacent said poles and forming air gaps therebetween, pivot means for pivoting said armature for swinging movement in opposite directions to cause one of said air gaps to increase and the other to decrease upon movement of the armature in one direction, means for guiding said pivot means for movement toward and from the plane of said pole faces, a control circuit and switch means therein operated by said armature.

13. In a frequency-matching device for varying the frequency of an alternating-current generator to be connected to an alternating-current system, a core structure providing two magnetic circuits, a winding associated with the core structure and producing magnetic flux in one of said magnetic circuits, an electrical circuit energized from the system and including said winding, a condenser in said electrical circuit connected in resonant relationship with respect to said winding, a second winding associated with the core structure and producing magnetic flux in the other magnetic circuit, a second electrical circuit including the second winding and energized by the generator, a condenser in said second electrical circuit connected in resonant relationship with respect to said second winding, a movable armature associated with the core structure, said armature being urged to move in one direction by the flux produced by one of said windings and being urged to move in the opposite direction by the flux produced by the other winding, said condensers and windings being proportioned to produce resonance in both of said circuits at approximately 125% of the normal frequency of the electrical system, a control circuit, and switch means therein operated by said armature.

14. In a synchronizing system for connecting to an electrical system a generator driven by a prime mover having a speed-varying device, said device being provided with a movable operating member and yieldable means for normally operating the same, an electric motor for moving said operating member independently of the yieldable means, an electric clutch adapted upon energization to effect a drive between said motor and operating member, a frequency-matching device for actuating said motor, a line switch for connecting the generator to the system and a switch normally closed when said line switch is open for controlling the energization of said clutch, said switch being adapted to be opened upon closing of the line switch.

15. In a frequency-matching device for varying the frequency of an alternating-current generator to be connected to an alternating-current system, a core structure having two magnetic poles, a winding energized by the system and producing magnetic flux through one of said poles, a winding energized by the generator and producing magnetic flux through the other of said poles, an armature having portions disposed adjacent said poles and forming air gaps therebetween, means for supporting said armature for movement toward and from the poles to alternately vary said air gaps, adjustable guide means for guiding the armature for movement toward and from the poles to simultaneously decrease or increase said air gaps, an adjusting member acting between said armature and said guide means for moving said armature relative thereto, a control circuit and switch means therein operated by said armature.

16. In a frequency-matching device for varying the frequency of an alternating-current generator to be connected to an alternating-current system, a core structure having two magnetic poles, a winding energized by the system and producing magnetic flux through one of said poles, a winding energized by the generator and producing magnetic flux through the other of said poles, an armature having portions disposed adjacent said poles and forming air gaps therebetween, means for supporting said armature for movement toward and from the poles to alternatively vary said air gaps, adjustable guide means for guiding the armature for movement toward and from the poles to simultaneously decrease or increase said air gaps; a threaded member acting between said armature and said guide means for moving said armature relative thereto, a control circuit and switch means therein operated by said armature.

WILLIAM R. CARTER.

REFERENCES CITED

The following references are of record in the file of this patent:

UNITED STATES PATENTS

| Number | Name | Date |
|---|---|---|
| 2,094,141 | Zingg | Sept. 28, 1937 |
| 2,104,801 | Hansell | Jan. 11, 1938 |

FOREIGN PATENTS

| Number | Country | Date |
|---|---|---|
| 29,639 | Netherlands | Apr. 15, 1933 |